United States Patent
Weiler et al.

(10) Patent No.: US 6,602,951 B2
(45) Date of Patent: Aug. 5, 2003

(54) USE OF HYDROPEROXIDES AS REGULATORS IN POLYMERIZATIONS

(75) Inventors: Peter Weiler, Burghausen (DE); Ulf Dietrich, Altoetting (DE); Peter Ball, Emmerting (DE)

(73) Assignee: Wacker Polymer Systems GmbH & Co. KG (DE)

( * ) Notice: Subject to any disclaimer, the term of this patent is extended or adjusted under 35 U.S.C. 154(b) by 0 days.

(21) Appl. No.: 10/059,768

(22) Filed: Jan. 29, 2002

(65) Prior Publication Data

US 2002/0137882 A1 Sep. 26, 2002

(30) Foreign Application Priority Data

Feb. 2, 2001 (DE) .......................... 101 04 723

(51) Int. Cl.⁷ .............................. C08L 31/00
(52) U.S. Cl. .................. 524/832; 524/779; 524/783; 524/787; 524/812; 524/817; 524/819; 524/821; 524/833
(58) Field of Search .............. 526/230; 524/779, 524/783, 787, 812, 817, 819, 821, 832, 833

(56) References Cited

U.S. PATENT DOCUMENTS

| 3,800,007 A |   | 3/1974  | Bafford |
|---|---|---|---|
| 3,879,360 A | * | 4/1975  | Patron et al. .......... 260/85.5 R |
| 4,098,977 A | * | 7/1978  | Zweigle et al. ............... 526/77 |
| 5,115,055 A | * | 5/1992  | Dais et al. ................... 526/225 |
| 5,698,648 A |   | 12/1997 | Rizzardo et al. |

FOREIGN PATENT DOCUMENTS

| WO | WO 91/07440 | 5/1991 |
|---|---|---|
| WO | WO 95/30697 | 11/1995 |

OTHER PUBLICATIONS

T.G. Fox, Bull. Am. Physics Soc. 1, 3. p. 123 [1996].
Polymer Handbook, 2$^{nd}$ Edition, J. Wiley and Sons, New York [1975].

* cited by examiner

Primary Examiner—Helen L. Pezzuto
(74) Attorney, Agent, or Firm—Brooks & Kushman P.C.

(57) ABSTRACT

The invention provides for the use of non-copolymerizable hydroperoxides of the formula R—O—O—H as regulators in the free-radically initiated polymerization of ethylenically unsaturated monomers, where R is H, a $C_1$–$C_{18}$-alkyl radical, a $C_7$–$C_{22}$-aralkyl radical or a saturated or unsaturated carbocyclic or heterocyclic ring having from 3 to 18 carbon atoms, and may be substituted or unsubstituted.

20 Claims, No Drawings

USE OF HYDROPEROXIDES AS REGULATORS IN POLYMERIZATIONS

BACKGROUND OF THE INVENTION

1. Field of the Invention

The invention pertains to the use of non-copolymerizable hydroperoxides of the general formula R—O—O—H as regulators in the free-radically initiated polymerization of ethylenically unsaturated monomers.

2. Background Art

Free-radical initiators or free-radical initiator combinations are used for initiating the polymerization of ethylenically unsaturated monomers. If the molecular weight of the resulting polymers is to be reduced to a desired value, it is usual to employ regulators in addition to the initiator. Customary regulators are, for example, mercaptans such as mercaptopropionic acid, 2-mercaptoethanol, 2-mercaptopropanol, mercaptoacetic acid, tert-butyl mercaptan, n-octyl mercaptan, n-dodecyl mercaptan and tert-dodecyl mercaptan. Further examples of regulators are hydroxylammonium salts such as hydroxylammonium sulfate; organic solvents such as toluene, diethylbenzene and xylene; halogenated solvents such as chloroform; formic acid; sodium bisulfite; and alcohols such as methanol. A disadvantage of these regulators is that mercaptans and halogenated hydrocarbons have a strong odor and are of concern from a toxicological point of view. Furthermore, both mercaptans and halogenated hydrocarbons are difficult to remove from the polymer dispersion formed.

U.S. Pat. No. 3,800,007 describes the bulk, solution, emulsion and suspension polymerization of α, β-unsaturated monomers using alkyl- or cycloalkyl-substituted cumene peroxides. The cumene peroxides are used in the temperature range of from −10° C. to 70° C. as auxiliaries for preparing peroxide-functional graft and block copolymers in a first step. In a second step, in the temperature range of from 80° C. to 150° C., the peroxide groups then decompose and initiate the graft or block copolymerization with further comonomers.

WO-A 95/30697 describes the use of organic peracids R—CO—O—O—H as regulators in polymerization reactions. The peracid is added in addition to a standard initiator in the polymerization, with the initiators being selected so that the polymerization takes place at a temperature below the decomposition temperature of the regulator.

WO-A 91/07440 discloses copolymerizable allyl hydroperoxides as regulators in polymerization processes. The objective was to provide reactive crosslinkable macromonomers for moldings and coatings. Owing to the bifunctionality of these molecules in having both an unsaturated group as well as a peroxidic group, polymers with bifunctional end groups which can subsequently be reacted by polymer-analogous reactions to provide epoxide functions are produced. The allyl hydroperoxides become fixed constituents of the polymer chain, thus altering the properties of the polymer, which is generally not desired. The copolymerizable allyl hydroperoxides also influence (slow) the polymerization behavior of the other monomers. Depending on the respective reactivities, the result can be different polymer compositions which in turn produce unique polymer properties.

SUMMARY OF THE INVENTION

It is an object of the invention to provide substances which are suitable for regulating the molecular weight in polymerizations and which can also be used without an additional initiator system, for simultaneously initiating the polymerization and regulating the molecular weight.

DETAILED DESCRIPTION OF THE PREFERRED EMBODIMENT(S)

The invention provides for the use of non-copolymerizable hydroperoxides of the general formula R—O—O—H as regulators in the free-radically initiated polymerization of ethylenically unsaturated monomers, where R is H, a $C_1$–$C_{18}$-alkyl radical, a $C_7$–$C_{22}$-aralkyl radical or a saturated or unsaturated carbocyclic or heterocyclic ring having from 3 to 18 carbon atoms. The hydrocarbon radicals R may be substituted or unsubstituted.

The radical R may be unbranched or branched and may be substituted by one or more substituents selected from the group consisting of halogen, hydroxy, alkoxy, aryloxy, epoxy, carboxyl, ester, amido, nitrile and keto groups. Preferred radicals R are, in addition to hydrogen, isopropyl, tert-butyl, tert-pentyl, 1,1-dimethylbutyl, and 1,1-dimethylpentyl radicals, each of which may be further substituted by an OH group. A preferred aralkyl radical is the cumene radical. As carbocyclic radicals, preference is given to the menthol and pinene radicals.

Particular preference is given to hydrogen peroxide, tert-butyl hydroperoxide, cumene hydroperoxide, diisopropylbenzene hydroperoxide, tert-pentyl hydroperoxide, 1,1-dimethylbutyl hydroperoxide, 1,1-dimethylpropyl hydroperoxide, 1,1-dimethyl-3-hydroxybutyl hydroperoxide, 1,1,3,3-tetramethylbutyl hydroperoxide, p-menthyl hydroperoxide, pinanyl hydroperoxide, 1-methylcyclopentyl hydroperoxide, 2-hydroperoxy-2-methyltetrahydrofuran, 1-methoxycyclohexyl hydroperoxide, 1,3,4,5,6,7-hexahydro-4a(2H)-naphthalenyl hydroperoxide, β-pinene hydroperoxide, and 2,5-dihydro-2-methyl-2-furanyl hydroperoxide.

The non-copolymerizable hydroperoxides can be used as regulators in conjunction with an initiator system. In a preferred embodiment, the hydroperoxides are used simultaneously as regulator and initiator without further free-radical initiators being employed. In general, the amount of hydroperoxide is from 0.01 to 15% by weight, preferably from 0.1 to 5% by weight, particularly preferably from 0.5 to 3% by weight, in each case based on the total weight of monomers.

As monomers, it is possible to use one or more monomers selected from the group consisting of vinyl esters of unbranched and branched alkylcarboxylic acids having from 1 to 18 carbon atoms; acrylic esters and methacrylic esters of branched and unbranched alcohols and diols having from 1 to 18 carbon atoms; ethylenically unsaturated monocarboxylic and dicarboxylic acids, their amides and N-methylolamides and nitriles; ethylenically unsaturated sulfonic acids; ethylenically unsaturated heterocyclic compounds; dienes; olefins; vinylaromatics; and vinyl halides.

Suitable vinyl esters are those of carboxylic acids having from 1 to 12 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 11 carbon atoms, for example VeoVa9[R] or VeoVa10[R] (trade names of Shell). Particular preference is given to vinyl acetate.

Suitable monomers from the group consisting of acrylic esters and methacrylic esters are esters of unbranched or branched alcohols having from 1 to 15 carbon atoms.

Preferred methacrylic esters and acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Examples of suitable ethylenically unsaturated monocarboxylic and dicarboxylic acids and their amides, N-methylolamides, and nitriles, are acrylic acid, methacrylic acid, fumaric acid, maleic acid, acrylamide, N-methylolacrylamide, N-methylolmethacrylamide, and acrylonitrile. Examples of ethylenically unsaturated sulfonic acids are vinylsulfonic acid and 2-acrylamido-2-methylpropanesulfonic acid. Suitable ethylenically unsaturated heterocyclic compounds are N-vinylpyrrolidone and N-vinylpyridine.

Preferred vinylaromatics are styrene, methylstyrene and vinyltoluene. The preferred vinyl halide is vinyl chloride. Preferred olefins are ethylene and propylene, and preferred dienes are 1,3-butadiene and isoprene.

If desired, from 0.1 to 5% by weight, based on the total weight of the monomer mixture, of auxiliary monomers can additionally be copolymerized. Preference is given to using from 0.5 to 2.5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or their salts, preferably vinylsulfonic acid or 2-acrylamido-2-methylpropane sulfonic acid. Further examples are precrosslinking comonomers such as multiply ethylenically unsaturated comonomers. Examples include divinyl adipate, diallyl maleate, diallyl phthalate, allyl methacrylate and triallyl cyanurate. Post-crosslinking comonomers may also be used, for example acrylamidoglycolic acid (AGA), methyl methylacrylamidoglycolate (MMAG), N-methylolacrylamide (NMA), N-methylolmethacrylamide, N-methylolallylcarbamate, alkyl ethers such as the isobutoxy ethers or esters of N-methylolacrylamide, N-methylolmethacrylamide, or N-methylolallylcarbamate. Also suitable are epoxy-functional comonomers such as glycidyl methacrylate and glycidyl acrylate. Further examples include silicon-functional comonomers such as acryloxypropyltri(alkoxy) silanes and methacryloxypropyltri(alkoxy)silanes, vinyltrialkoxysilanes and vinylmethyldialkoxysilanes, the alkoxy groups being, for example, ethoxy and ethoxypropylene glycol ether radicals. Mention may also be made of monomers containing hydroxy or CO groups, for example hydroxyalkyl esters of methacrylic acid and acrylic acid, e.g. hydroxyethyl, hydroxypropyl or hydroxybutyl acrylate or methacrylate, and also compounds such as diacetoneacrylamide and acetylacetoxyethyl acrylate or methacrylate.

Particular preference is given to monomers selected from vinyl acetate, vinyl esters of α-branched monocarboxylic acids having from 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and mixtures thereof. The greatest preference is given to mixtures of vinyl acetate with ethylene; of vinyl acetate, ethylene and a vinyl ester of an a-branched monocarboxylic acid having from 9 to 11 carbon atoms; of n-butyl acrylate with 2-ethylhexyl acrylate and/or methyl methacrylate; of styrene with one or more monomers selected from the group consisting of methyl acrylate, ethyl acrylate, propyl acrylate, n-butyl acrylate and 2-ethylhexyl acrylate; and of vinyl acetate with one or more monomers selected from methyl acrylate, ethyl acrylate, propyl acrylate, n-butyl acrylate, 2-ethylhexyl acrylate and optionally ethylene. The aforesaid mixtures may further comprise one or more auxiliary monomers.

The choice of comonomers and their relative proportions by weight is preferably made so that a glass transition temperature ("$T_g$") from –50° C. to +120° C., more preferably from –30° C. to +95° C., results. The glass transition temperature $T_g$ of the polymers can be determined in a known manner by means of differential scanning calorimetry (DSC). The $T_g$ can also be calculated approximately in advance by means of the Fox equation. According to T. G. Fox, BULL. A, PHYSICS SOC. 1, 3, page 123 (1956): $1/T_g = x_1/T_{g1} + x_2/T_{g2} + \ldots + x_n/T_{gn}$, where $x_n$ is the mass fraction (% by weight/100) of the monomer n and $T_{gn}$ is the glass transition temperature in Kelvin of the homopolymer of the monomer n. $T_g$ values for homopolymers are given in Polymer Handbook 2nd Edition, J. Wiley & Sons, New York (1975).

The free-radically initiated polymerization of the ethylenically unsaturated monomers can in principle be carried out using all polymerization methods known for this purpose, e.g. bulk polymerization, solution polymerization, precipitation polymerization, suspension polymerization and emulsion polymerization. Preference is given to solution, suspension and emulsion polymerization. Greatest preference is given to suspension and emulsion polymerization.

The polymerization temperature is generally from 40° C. to 100° C., preferably from 60° C. to 90° C. The copolymerization of gaseous comonomers such as ethylene, 1,3-butadiene or vinyl chloride may optionally be carried out under superatmospheric pressure, generally from 5 bar to 100 bar. The initiation of the polymerization can be carried out using the customary water-soluble or monomer-soluble initiators or redox initiator combinations. Examples of water-soluble initiators are the sodium, potassium and ammonium salts of peroxodisulfuric acid, hydrogen peroxide, t-butyl peroxide, potassium peroxodiphosphate, t-butylperoxopivalate, cumene hydroperoxide, isopropylbenzene monohydroperoxide, asobisisobutyronitrile. Examples of monomer-soluble initiators are dicetyl peroxydicarbonate, dicyclohexyl peroxydicarbonate, dibenzoyl peroxide, Trigonot, t-butylper-2-ethylhexanoate and t-butylperpivalate. These initiators are generally used in an amount of from 0.01 to 10.0% by weight, preferably from 0.1 to 0.5% by weight, in each case based on the total weight of monomers. As redox initiators, use is made of combinations of the abovementioned initiators with reducing agents. Suitable reducing agents are the sulfites and bisulfites of the alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is generally from 0.01 to 10.0% by weight, preferably from 0.1 to 0.5% by weight, in each case based on the total weight of monomers. In a preferred embodiment, no further free-radical initiators are added apart from the non-copolymerizable hydroperoxide.

In the preferred processes of suspension and emulsion polymerization, the polymerization is carried out in the presence of surface-active substances such as protective colloids and/or emulsifiers. Suitable protective colloids are, for example, partially saponified polyvinyl alcohols, polyvinylpyrrolidones, polyvinyl acetals, starches, celluloses and their carboxymethyl, methyl, hydroxyethyl and hydroxypropyl derivatives. Suitable emulsifiers include anionic, cationic and nonionic emulsifiers, for example anionic surfactants such as alkyl sulfates having a chain length of from 8 to 18 carbon atoms, alkyl or alkylaryl ethers sulfates having from 8 to 18 carbon atoms in the hydrophobic radical and up to 60 ethylene oxide or propylene oxide units, alkylsulfonates or alkylarylsulfonates having from 8 to 18 carbon atoms, esters and monoesters of sulfosuccinic acid with monohydric alcohols or alkylphenols, or nonionic surfactants such as alkyl polyglycol ethers or alkylaryl polyglycol ethers having up to 60 ethylene oxide or propylene oxide units.

It is possible for all the monomers to be charged initially, all of them to be metered in or part of them to be charged initially and the remainder to be metered in after initiation of the polymerization. The metered additions can be carried out separately (in space and in time), or all or some of the components to be metered in can be metered in preemulsified form.

It is possible for all of the hydroperoxides used as regulators to be charged initially, all of them to be metered in or part of them to be charged initially and the remainder to be metered in. If the hydroperoxides are used only as regulators and in combination with an initiator, it is possible for all of the hydroperoxide to be charged initially, or all of it to be metered in together with monomer or initiator, or part of it to be charged initially and the remainder to be metered in together with monomer or initiator. In those process variants in which all or part of the hydroperoxide is metered in, preference is given to metering in the hydroperoxide regulator in a molar ratio of more than 0.2:1 to the initiator in the initiation of the polymerization. This metering rate can be increased as desired during the course of the polymerization.

If the hydroperoxides are used both as regulator and as initiator, all of the hydroperoxide is charged initially, or all of it is metered in together with monomer, or part of it is charged initially and the remainder is metered in together with monomer, and the reducing agent is in each case metered in. The hydroperoxide is particularly preferably initially charged or metered in in such amounts that the molar ratio of hydroperoxide to reducing agent is from 1.2:1 to 20:1, preferably from 1.5:1 to 7.5:1.

After the polymerization is complete, residual monomers and volatile components can be removed by means of after-polymerization, distillation, stripping with inert gas or a combination of these measures. To produce polymer powders which are redispersable in water, the aqueous dispersions can, after addition of protective colloids as atomizing aids, be spray dried in a known manner.

The polymers which are obtainable by use according to the invention of hydroperoxide regulators can be used in the applications typical for such polymers, for example in building chemicals, if desired in combination with hydraulic binders such as cements (Portland cement, alumina cement, pozzolanic cement, slag cement, magnesia cement, phosphate cement), plaster of Paris, water glass, for the production of building adhesives, in particular tile adhesives and insulating adhesives, plasters and renders, knifing fillers, flooring screeds, self-spreading compositions, sealing slurries, jointing mortars and paints. They can also be used as binders for coating compositions and adhesives or as coating compositions and binders for textiles, fibers, wood and paper.

EXAMPLE 1

Preparation of an NMA Homopolymer with Tert-butyl Hydroperoxide Regulation 6.73 kg of deionized water and 5.4 g of a 40% strength tert-butyl hydroperoxide solution were placed in a reactor having a volume of 20 liters and the mixture was heated to 60° C. while stirring. When temperature equilibrium had been reached, the initiator feed streams and, 5 minutes later, the monomer feed stream were fed in.

Initiator feed stream 1:804 g of deionized water, 78 g of sodium peroxodisulfate and 36 g of 40% strength tert-butyl hydroperoxide solution.

Initiator feed stream 2:1.5 kg of deionized water, 78 g of sodium hydrogencarbonate and 83 g of sodium formaldehyde sulfoxylate.

Monomer feed stream: 9.1 kg of 48% strength aqueous N-methylolacrylamide solution (NMA)

After the monomer had been metered in over a period of one hour, the initiator feed streams were allowed to continue to run in for half an hour. The solids content of the aqueous polymer solution was 25% and the K value was 41.

COMPARATIVE EXAMPLE 2

Preparation of an NMA Homopolymer without Regulation 955.8 g of deionized water were placed in a reactor having a volume of 2 liters and were heated to 60° C. while stirring. When temperature equilibrium had been reached, the initiator feed streams and, 5 minutes later, the monomer feed stream were fed in.

Initiator feed stream 1:67.7 g of deionized water and 6.6 g of sodium peroxodisulfate.

Initiator feed stream 2:124.4 g of deionized water, 6.6 g of sodium hydrogencarbonate and 7 g of sodium formaldehyde sulfoxylate.

Monomer feed stream: 762.4 g of 48% strength aqueous N-methylolacrylamide solution.

After the monomer had been metered in over a period of one hour, the initiator feed streams were allowed to continue to run in for half an hour. The solids content of the aqueous polymer solution thus prepared was 18.6% and the K value was 87.

COMPARATIVE EXAMPLE 3

Preparation of a Suspension Polymer without Regulation 883.4 g of deionized water, 24.9 g of 1% strength aqueous copper acetate solution, 120 g of 5% strength polyvinylpyrrolidone solution (K value: 90), 279 g of butyl acrylate and 677.4 g of styrene were placed in a 2 liter reactor. The pH of the mixture was adjusted to 6. After addition of the initiator mixture comprising 10.8 g of t-butyl peroxyneodecanoate (75% strength solution in aliphatics), 8 g of t-butyl peroxypivalate (75% strength solution in aliphatics) and 10.2 g of t-butyl peroxy-2-ethylhexanoate, the mixture was heated to 55° C. while stirring. After 4 hours, the reaction temperature was increased to 70° C. and after a further 4 hours to 90° C. The mixture was cooled and the suspension polymer was washed with deionized water, filtered off with suction and dried. The K value of the polymer thus prepared was 57.

EXAMPLE 4

Preparation of a Suspension Polymer with Tert-butyl Hydroperoxide Regulation 860.8 g of deionized water, 7.1 g of 1% strength aqueous copper acetate solution, 150.8 g of 5% strength polyvinylpyrrolidone solution (K value: 90), 11.8 g of 40% strength tert-butyl hydroperoxide solution, 263.9 g of butyl acrylate and 640.9 g of styrene were placed in a 2 liter reactor. The pH of the mixture was adjusted to 6. After addition of the initiator mixture comprising 10.2 g of tert-butyl peroxyneodecanoate, 7.5 g of tert-butyl perpivalate and 7.7 g of tert-butyl per-2-ethylhexanoate, the mixture was heated to 55° C. while stirring. After 4 hours, the reaction temperature was increased to 70° C. and after a further 4 hours to 90° C. The mixture was cooled and the suspension polymer was washed with deionized water, filtered off with suction and dried. The K value of the polymer thus prepared was 45.

COMPARATIVE EXAMPLE 5

Preparation of a Suspension Polymer with Dodecyl Mercaptan Regulation 873 g of deionized water, 7 g of 1% strength aqueous copper acetate solution, 150.4 g of 5% strength polyvinylpyrrolidone solution (K value: 90), 4.7 g of dodecyl mercaptan, 263.1 g of butyl acrylate and 639 g of styrene were placed in a 2 liter reactor. The pH of the mixture was adjusted to 6. After addition of the initiators, viz. 10.2 g of tert-butyl peroxyneodecanoate (75% strength solution in aliphatics), 7.5 g of tert-butyl peroxypivalate (75% strength solution in aliphatics) and 5.8 g of tert-butyl peroxy-2-ethylhexanoate, the mixture was heated to 55° C. while stirring. After 4 hours, the reaction temperature was increased to 70° C. and after a further 4 hours to 90° C. The mixture was cooled and the suspension polymer was washed with deionized water, filtered off with suction and dried. The K value of the polymer thus prepared was 50.

COMPARATIVE EXAMPLE 6

Preparation of an Emulsion Polymer without Regulation 345.4 g of deionized water, 11.8 g of sodium lauryl sulfate, 93.9 g of styrene and 34.5 g of butyl acrylate were placed in a 2 liter reactor and the mixture was heated to 80° C. while stirring. At 40° C., the initiator solution (8.9 g of potassium peroxodisulfate and 246.7 g of deionized water) was introduced into the reactor. 15 minutes after temperature equilibrium had been reached at 80° C., introduction of the initiator and monomer feed streams was commenced.

Initiator feed stream: 296 g of deionized water and 10.9 g of potassium peroxodisulfate.

Monomer feed stream: 122.5 g of deionized water, 577.1 g of styrene, 212.2 g of butyl acrylate, 16.5 g of 30% strength aqueous acrylamide solution, 17 g of 50% strength aqueous 2-acrylamide-2-methylpropanesulfonic acid, 9.9 g of acrylic acid, 44.4 g of methacrylic acid, 6.0 g of 12.5% strength aqueous ammonia solution and 11.8 g of sodium lauryl sulfate.

The pH was set to from 4 to 4.5 during the reaction. After all of the monomer feed stream had been introduced over a period of 4 hours, the initiator feed stream was allowed to run in for another 1 hour and the pH was adjusted to 7.5 by means of 12.5% strength ammonia solution. The solids content of the polymer dispersion thus prepared was 53%, the viscosity was 14,000 mPas and the K value was 69.

COMPARATIVE EXAMPLE 7

Preparation of an Emulsion Polymer with Dodecyl Mercaptan Regulation 345.4 g of deionized water, 11.8 g of sodium lauryl sulfate, 93.9 g of styrene and 34.5 g of butyl acrylate were placed in a 2 liter reactor and the mixture was heated to 80° C. while stirring. At 40° C., the initiator solution (8.9 g of potassium peroxodisulfate and 246.7 g of deionized water) was introduced into the reactor. 15 minutes after temperature equilibrium had been reached at 80° C., introduction of the initiator and monomer feed streams was commenced.

Initiator feed stream: 296 g of deionized water and 10.9 g of potassium peroxodisulfate.

Monomer feed stream: 122.5 g of deionized water, 577.1 g of styrene, 212.2 g of butyl acrylate, 4.9 g of dodecyl mercaptan, 16.5 g of 30% strength aqueous acrylamide solution, 17 g of 50% strength aqueous 2-acrylamide-2-methylpropanesulfonic acid, 9.9 g of acrylic acid, 44.4 g of methacrylic acid, 6.0 g of 12.5% strength aqueous ammonia solution and 11.8 g of sodium lauryl sulfate.

The pH was set to from 4 to 4.5 during the reaction. After all of the monomer feed stream had been introduced over a period of 4 hours, the initiator feed stream was allowed to run in for another 1 hour and the pH was adjusted to 7.5 by means of 12.5% strength ammonia solution. The solids content of the polymer dispersion thus prepared was 52.1%, the viscosity was 1840 mPas and the K value was 34.

EXAMPLE 8

Preparation of an Emulsion Polymer with Tert-butyl Hydroperoxide Regulation 198.2 g of deionized water, 49.5 g of 40% strength tert-butyl hydroperoxide solution, 11.9 g of sodium lauryl sulfate, 94.3 g of styrene and 34.7 g of butyl acrylate were placed in a 2 liter reactor and the mixture was heated to 80° C. while stirring. At 40° C., the initiator solution (8.9 g of potassium peroxodisulfate and 247.7 g of deionized water) was introduced into the reactor. 15 minutes after temperature equilibrium had been reached at 80° C., introduction of the initiator and monomer feed streams was commenced.

Initiator feed stream: 297.3 g of deionized water and 10.9 g of potassium peroxodisulfate Monomer feed stream: 217.1 g of deionized water, 579.5 g of styrene, 213 g of butyl acrylate, 16.5 g of 30% strength aqueous acrylamide solution, 17.1 g of 50% strength aqueous 2-acrylamide-2-methylpropanesulfonic acid, 9.9 g of acrylic acid, 44.6 g of methacrylic acid, 6.0 g of 12.5% strength aqueous ammonia solution and 11.9 g of sodium lauryl sulfate.

The pH was set to from 4 to 4.5 during the reaction. After all of the monomer feed stream had been introduced over a period of 4 hours, the initiator feed stream was allowed to run in for another 1 hour and the pH was adjusted to 7.5 by means of 12.5% strength ammonia solution.

The solids content of the polymer dispersion thus prepared was 54.7%, the viscosity was 3750 mPas, and the K value was 29.

EXAMPLE 9

Preparation of an Emulsion Polymer with Tert-butyl Hydroperoxide Regulation and Initiation 440.3 g of deionized water, 16.7 g of 20% strength sodium dihexyl sulfosuccinate solution, 95.3 g of styrene and 35 g of butyl acrylate were placed in a 2 liter reactor and the mixture was heated to 80° C. while stirring. At 70° C., introduction of the initiator feed streams was commenced.

Initiator feed stream 1:150.1 g of deionized water and 5 g of sodium formaldehyde sulfoxylate.

Initiator feed stream 2: 29 g of deionized water, 3.8 g of 40% strength tert-butyl hydroperoxide solution.

After 1 hour the concentration of initiator feed stream 2 was increased and the monomer feed stream was fed in.

Initiator feed stream 2a: 116.1 g of deionized water, 46.3 g of 40% strength tert-butyl hydroperoxide solution.

Monomer feed stream: 186.3 g of deionized water, 585.3 g of styrene, 215.2 g of butyl acrylate, 16.7 g of 30% strength aqueous acrylamide solution, 17.3 g of 50% strength aqueous 2-acrylamide-2-methylpropanesulfonic acid, 10 g of acrylic acid, 45 g of methacrylic acid, 6 g of 12.5% strength aqueous ammonia solution, 10 g of fatty alcohol polyglycol ether having from 12 to 14 carbon atoms in the fatty alcohol and 50 EO units and 32.3 g of 31% strength aqueous solution of a disodium lauryl ether sulfosuccinate having 6 EO units.

The pH was set to from 4 to 4.5 during the reaction. After the monomer feed stream had been introduced over a period of four hours, the initiator feed streams 1 and 2a were allowed to run in for another one hour and the pH was adjusted to 7.5 by means of 12.5% strength ammonia solution. The solids content of the polymer dispersion thus prepared was 49.9%, the viscosity was 26 mPas and the K value was 32.

EXAMPLE 10

Preparation of an Emulsion Polymer with Tert-butyl Hydroperoxide Regulation and Initiation 440.3 g of deionized water, 16.7 g of 20% strength sodium dihexyl sulfosuccinate solution, 95.3 g of styrene and 35 g of butyl acrylate were placed in a 2 liter reactor and the mixture was heated to 80° C. while stirring. At 70° C., introduction of the initiator feed streams was commenced.

Initiator feed stream 1: 150.1 g of deionized water and 5.7 g of ascorbic acid.

Initiator feed stream 2: 29 g of deionized water, 3.8 g of 40% strength tert-butyl hydroperoxide solution.

After 1 hour the concentration of initiator feed stream 2 was increased and the monomer feed stream was fed in.

Initiator feed stream 2a: 116.1 g of deionized water, 46.3 g of 40% strength tert-butyl hydroperoxide solution.

Monomer feed stream: 186.3 g of deionized water, 585.3 g of styrene, 215.2 g of butyl acrylate, 16.7 g of 30% strength aqueous acrylamide solution, 17.3 g of 50% strength aqueous 2-acrylamide-2-methylpropanesulfonic acid, 10 g of acrylic acid, 45 g of methacrylic acid, 6 g of 12.5% strength aqueous ammonia solution, 10 g of fatty alcohol polyglycol ether having from 12 to 14 carbon atoms in the fatty alcohol and 50 EO units and 32.3 g of 31% strength aqueous solution of a disodium lauryl ether sulfosuccinate having 6 EO units.

The pH was set to from 4 to 4.5 during the reaction. After the monomer feed stream had been introduced over a period of four hours, the initiator feed streams 1 and 2a were allowed to run in for another one hour and the pH was adjusted to 7.5 by means of 12.5% strength ammonia solution. The solids content of the polymer dispersion thus prepared was 49.9%, the viscosity was 50 mPas and the K value was 33.

EXAMPLE 11

Preparation of an Emulsion Polymer with Tert-butyl Hydroperoxide Regulation and Initiation 440.3 g of deionized water, 16.7 g of 20% strength sodium dihexyl sulfosuccinate solution, 95.3 g of styrene and 35 g of butyl acrylate were placed in a 2 liter reactor and the mixture was heated to 80° C. while stirring. At 70° C., introduction of the initiator feed streams was commenced.

Initiator feed stream 1: 150.1 g of deionized water and 4.1 g of sodium sulfite.

Initiator feed stream 2: 29 g of deionized water, 3.8 g of 40% strength tert-butyl hydroperoxide solution.

After 1 hour the concentration of initiator feed stream 2 was increased and the monomer feed stream was fed in.

Initiator feed stream 2a: 116.1 g of deionized water, 46.3 g of 40% strength tert-butyl hydroperoxide solution.

Monomer feed stream: 186.3 g of deionized water, 585.3 g of styrene, 215.2 g of butyl acrylate, 16.7 g of 30% strength aqueous acrylamide solution, 17.3 g of 50% strength aqueous 2-acrylamide-2-methylpropanesulfonic acid, 10 g of acrylic acid, 45 g of methacrylic acid, 6 g of 12.5% strength aqueous ammonia solution, 10 g of fatty alcohol polyglycol ether having from 12 to 14 carbon atoms in the fatty alcohol and 50 EO units and 32.3 g of 31% strength aqueous solution of a disodium lauryl ether sulfosuccinate having 6 EO units.

The pH was set to from 4 to 4.5 during the reaction. After the monomer feed stream had been introduced over a period of four hours, the initiator feed streams 1 and 2a were allowed to run in for another one hour and the pH was adjusted to 7.5 by means of 12.5% strength ammonia solution. The solids content of the polymer dispersion thus prepared was 49.1%, the viscosity was 76 mPas and the K value was 33.

COMPARATIVE EXAMPLE 12

Preparation of an Emulsion Polymer without Regulation 887.9 g of deionized water, 41.3 g of 20% strength sodium dihexyl sulfosuccinate solution, 15.1 g of 10% strength acetic acid and 206.5 g of vinyl acetate were placed in a 5 liter laboratory autoclave, the mixture was heated to 75° C. while stirring and the autoclave was pressurized with ethylene to 30 bar. This pressure was maintained during the entire time over which the monomers were metered in. When temperature equilibrium had been reached, the initiator feed streams, viz. a 3% strength aqueous solution of potassium peroxodisulfate and a 1.5% strength aqueous solution of sodium formaldehyde sulfoxylate, were fed in. Two minutes after commencement of the reaction, introduction of the monomer and emulsifier feed streams was started.

Monomer feed stream: 1.86 kg of vinyl acetate.

Emulsifier feed stream: 991.1 g of deionized water, 20.7 g of 50% strength aqueous 2-acrylamide-2-methylpropanesulfonic acid and 206.5 g of 30% strength sodium lauryl sulfate solution.

After all of the monomer feed stream had been metered in over a period of three hours, the initiator feed streams were allowed to run in for another one hour. The solids content of the polymer dispersion thus prepared was 51.2%, the viscosity was 50 mPas, the K value was 110 and the $T_g$ was 6.4° C.

COMPARATIVE EXAMPLE 13

Preparation of an Emulsion Polymer with Dodecyl Mercaptan Regulation 888.8 g of deionized water, 40.9 g of 20% strength sodium dihexyl sulfosuccinate solution, 15 g of 10% strength acetic acid and 204.4 g of vinyl acetate were placed in a 5 liter laboratory autoclave, the mixture was heated to 75° C. while stirring and the autoclave was pressurized with ethylene to 30 bar. This pressure was maintained during the entire time over which the monomers were metered in. When temperature equilibrium had been reached, the initiator feed streams, viz. a 3% strength aqueous solution of potassium peroxodisulfate and a 1.5% strength aqueous solution of sodium formaldehyde sulfoxylate, were fed in. Two minutes after commencement of the reaction, introduction of the monomer and emulsifier feed streams was started.

Monomer feed stream: 1.84 kg of vinyl acetate and 20.4 g of dodecyl mercaptan.

Emulsifier feed stream: 991 g of deionized water, 20.7 g of 50% strength aqueous 2-acrylamide-2-methylpropanesulfonic acid and 204.4 g of 30% strength sodium lauryl sulfate solution.

After all of the monomer feed stream had been metered in over a period of three hours, the initiator feed streams were allowed to run in for another one hour. The solids content of the polymer dispersion thus prepared was 51.2%, the viscosity was 47 mPas, the K value was 63 and the $T_g$ was 7.4° C.

EXAMPLE 14

Preparation of an Emulsion Polymer with Tert-butyl Hydroperoxide Regulation 1080 g of deionized water, 71.7 g of 20% strength sodium dihexyl sulfosuccinate solution, 3 g of 10% strength formic acid and 177 g of vinyl acetate were placed in a 5 liter laboratory autoclave, the mixture was heated to 50° C. while stirring and the autoclave was pressurized with ethylene to 30 bar. This pressure was maintained until 300 g of ethylene had been incorporated. When temperature equilibrium had been reached, the initiator feed streams, viz. a 3% strength aqueous tert-butyl hydroperoxide solution and a 5% strength aqueous solution of sodium formaldehyde sulfoxylate, were fed in. Thirty minutes after commencement of the reaction, introduction of the monomer and emulsifier feed streams was started.

Monomer feed stream: 1.61 kg of vinyl acetate.

Emulsifier feed stream: 1080 g of deionized water, 16.7 g of 50% strength aqueous 2-acrylamide-2-methylpropanesulfonic acid, 26.9 g of fatty alcohol polyglycol ether having from 12 to 14 carbon atoms in the fatty alcohol and 50 EO units and 71.7 g of 25% strength aqueous solution of an alkyl ether sulfate having an isotridecyl radical and 20 EO units.

After all of the monomer feed stream had been metered in over a period of five hours, the initiator feed streams were allowed to run in for another one hour. The solids content of the polymer dispersion thus prepared was 44.4%, the viscosity was 23 mPas, the K value was 69 and the $T_g$ was 5.3° C.

The results of the molecular weight determination are summarized in Table 1.

The molecular weight was determined indirectly via the K value (Fikentscher method, DIN 53726). For this purpose, 100 ml of a 1% strength polymer solution in THF were prepared. 1 g of polymer in the form of the solution or dispersion was weighed to within 1% into a volumetric flask and water was added in such an amount that the total amount of water was 8.0 g. This sample was homogenized and admixed with THF or water while stirring until a clear solution had been obtained, and was subsequently made up to 100 ml with THF or water. The relative viscosity or flow rate of the one percent strength polymer solution was compared with the pure solvent. According to the Fikentscher method, the K values can then be calculated from the relative viscosities and the polymer concentration.

The hydroperoxides used according to the invention as regulators enable the K value of emulsion polymers, which without regulation is generally in the range from 70 to 120, to be reduced to values of from 10 to 40 without the abovementioned disadvantages of conventional regulators (odor, contamination of the polymer dispersions) appearing.

TABLE 1

| Example | Polymerization method | Regulator | Molecular weight (K value) |
|---|---|---|---|
| Example 1 | Solution | TBHP | 41 |
| Comp. Ex. 2 | Solution | | 87 |
| Comp. Ex. 3 | Suspension | | 57 |
| Example 4 | Suspension | TBHP | 45 |
| Comp. Ex. 5 | Suspension | DDM | 50 |
| Comp. Ex. 6 | Emulsion | | 69 |
| Comp. Ex. 7 | Emulsion | DDM | 34 |
| Example 8 | Emulsion | TBHP | 29 |
| Example 9 | Emulsion | TBHP | 32 |
| Example 10 | Emulsion | TBHP | 33 |
| Example 11 | Emulsion | TBHP | 33 |
| Comp. Ex. 12 | Emulsion | | 110 |
| Comp. Ex. 13 | Emulsion | DDM | 63 |
| Example 14 | Emulsion | TBHP | 69 |

TBHP = tert-butyl hydroperoxide, DDM = dodecyl mercaptan

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for emulsion or suspension polymerization by free radical polymerization of unsaturated monomers in the presence of a free radical polymerization initiator in water, the improvement comprising polymerizing said at least one unsaturated monomer in the presence of an effective molecular weight limiting amount of at least one non-copolymerizable hydroperoxide regulator of the formula

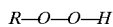

R—O—O—H wherein R is H, or an optionally substituted hydrocarbyl radical selected from the group consisting of $C_{1-18}$ alkyl, $C_{7-22}$ aralkyl, $C_{3-18}$ saturated or unsaturated carbocyclic radical, and $C_{3-18}$ saturated or unsaturated heterocyclic radical, wherein when said hydroperoxide is also employed as said free radical initiator, a reducing agent is also employed, and the mol ratio of said hydroperoxide to said reducing agent is from 1.2:1 to 20:1, and when said hydroperoxide is employed as a regulator with a non-hydroperoxide free radical initiator, the mol ratio of hydroperoxide to free radical initiator is greater than 0.2:1 at the onset of polymerization, said emulsion or suspension polymerization taking place in the presence of at least one surface active agent selected from the group consisting of protective colloids and emulsifiers, said unsaturated monomers comprising no more than about 0.1 to 5 weight percent of water soluble auxiliary monomers.

2. The process of claim 1, wherein the radical R is hydrogen, or a hydrocarbyl radical selected from the group consisting of isopropyl, tert-butyl, tert-pentyl, 1,1-dimethylbutyl, and 1,1-dimethylpentyl, each hydrocarbyl radical optionally substituted by an OH group.

3. The process of claim 1, wherein said hydroperoxide regulator comprises one or morn hydroperoxides selected from the group consisting of hydrogen peroxide, tert-butyl hydroperoxide, cumene hydroperoxide, diisopropylbenzene hydroperoxide, tert-pentyl hydroperoxide, 1,1-dimethylbutyl hydroperoxide, 1,1-dimethylpropyl hydroperoxide, 1,1-dimethyl-3-hydroxybutyl hydroperoxide, 1,1,3,3-tetramethylbutyl hydroperoxide, p-mentylhydroperoxide, pinanylhydroperoxide, 1-methylcyclopentyl hydroperoxide, 2-hydroperoxy-2-methyltetrahydrofuran, 1-methoxycyclohexyl hydroperoxide, 1,3,4,5,6,7-hexahydro-4a(2H)-naphthalenylhydroperoxide, β-pinene hydroperoxide and 2,5-dihydro-2-methyl-2-furanyl hydroperoxide.

4. The process of claim 1, wherein said at least one unsaturated monomer is selected from the group consisting of vinyl esters of unbranched and branched $C_{1-18}$ alkylcarboxylic acid;
   acrylic esters and methacrylic esters of branched and unbranched $C_{1-18}$ alcohols and diols, ethylenically unsaturated monocarboxylic and dicarboxylic acids, their amides, N-methylolamides, and nitriles;
   ethylenically unsaturated sulfonic acids;
   ethylenically unsaturated heterocyclic compounds;
   dienes;
   olefins;
   vinylaromatics; and
   vinyl halides.

5. The process of claim 1, wherein the non-copolymerizable hydroperoxides are used simultaneously as regulator and initiator without further free-radical initiators being used.

6. The process of claim 1, wherein said polymerization is an emulsion polymerization.

7. The process of claim 1, wherein the polymerization is a suspension or emulsion polymerization in the presence of an emulsifier.

8. The process of claim 7 wherein said surface active agent comprises a protective colloid.

9. The process of claim 1, wherein all or part of the non-copolymerizable hydroperoxide is metered in during the polymerization.

10. The process of claim 9, wherein the hydroperoxide non-copolymerizable is employed as a regulator in combination with a non-hydroperoxide free radical polymerization initiator; and
   the hydroperoxide is metered in in a molar ratio of more than 0.2:1 to the initiator in the initiation of the polymerization.

11. The process of claim 7, wherein the hydroperoxides are used both as regulator and as initiator, and are initially charged and metered in in such amounts that the molar ratio of hydroperoxide to reducing agent is from 1.5:1 to 7.5:1.

12. The process of claim 1 wherein said free radical polymerization initiator comprises one or more organic peroxides.

13. The process of claim 1 wherein said reducing agent is selected from the group consisting of alkali metal sulfites, alkali metal bisulfites, ammonium sulfite, ammonium bisulfite, and zinc and alkali metal derivatives of sulfoxylic acid.

14. The process of claim 11 wherein said reducing agent is selected from the group consisting of alkali metal sulfites, alkali metal bisulfites, ammonium sulfite, ammonium bisulfite, and zinc and alkali metal derivatives of sulfoxylic acid.

15. The process of claim 1 wherein said non-copolymerizable hydroperoxide is t-butylhydroperoxide.

16. The process of claim 15 wherein said t-butylhydroperoxide is used as a regulator and one or more organic peroxides, a peroxodisulfate or mixtures thereof are employed as the free radical polymerization initiator in conjunction with a reducing agent.

17. The process of claim 1 wherein said polymer prepared employing said non-copolymerizable hydroperoxide has a K value between 10 and 40 when a polymer prepared similarly but without any regulator has a K value between 70 and 120.

18. The process of claim 1 wherein said polymer prepared employing said non-copolymerizable hydroperoxide has a K value less than a polymer prepared similarly but with an equivalent weight amount of an n-alkylmercaptan regulator.

19. The process of claim 1, wherein from 95 weight percent to 99.9 weight percent of said unsaturated monomers are selected from the group consisting of vinyl esters of unbranched and branched $C_{1-18}$ alkylcarboxylic acid;
   acrylic esters and methacrylic esters of branched and unbranched $C_{1-18}$ alcohols and diols, monoolefins, diolefins, vinyl aromatics, and vinyl halides.

20. The process of claim 1, wherein said surface active agent is a polyvinyl alcohol protective colloid.

* * * * *

UNITED STATES PATENT AND TRADEMARK OFFICE
CERTIFICATE OF CORRECTION

PATENT NO. : 6,602,951 B2
DATED : August 5, 2003
INVENTOR(S) : Peter Weiler et al.

It is certified that error appears in the above-identified patent and that said Letters Patent is hereby corrected as shown below:

<u>Column 13,</u>
Line 7, delete "morn" and insert therefor -- more --.
Line 14, delete "p-mentylhydroperoxide" and insert therefor
-- p-menthylhydroperoxide --.

Signed and Sealed this

Twenty-eighth Day of October, 2003

JAMES E. ROGAN
*Director of the United States Patent and Trademark Office*